United States Patent
Gassoway

(10) Patent No.: US 8,225,394 B2
(45) Date of Patent: Jul. 17, 2012

(54) METHOD AND SYSTEM FOR DETECTING MALWARE USING A SECURE OPERATING SYSTEM MODE

(75) Inventor: Paul A. Gassoway, Norwood, MA (US)

(73) Assignee: CA, Inc., Islandia, NY (US)

( * ) Notice: Subject to any disclaimer, the term of this patent is extended or adjusted under 35 U.S.C. 154(b) by 1335 days.

(21) Appl. No.: 11/735,130

(22) Filed: Apr. 13, 2007

(65) Prior Publication Data
US 2008/0256635 A1    Oct. 16, 2008

(51) Int. Cl.
*G06F 11/00* (2006.01)
*G06F 9/00* (2006.01)
*G06F 11/30* (2006.01)

(52) U.S. Cl. .................. 726/22; 726/23; 726/24; 713/2; 713/188

(58) Field of Classification Search .................. 713/188, 713/2; 726/23, 24, 22
See application file for complete search history.

(56) References Cited

U.S. PATENT DOCUMENTS

| | | | |
|---|---|---|---|
| 5,956,481 A * | 9/1999 | Walsh et al. | 726/23 |
| 7,188,368 B2 * | 3/2007 | Swimmer et al. | 726/24 |
| 7,216,367 B2 * | 5/2007 | Szor | 726/25 |
| 7,356,736 B2 * | 4/2008 | Natvig | 714/38 |
| 7,509,680 B1 * | 3/2009 | Sallam | 726/24 |
| 7,647,636 B2 * | 1/2010 | Polyakov et al. | 726/24 |
| 7,650,639 B2 * | 1/2010 | Kramer et al. | 726/23 |
| 2002/0144121 A1 * | 10/2002 | Ellison et al. | 713/176 |
| 2006/0015747 A1 * | 1/2006 | Van de Ven | 713/188 |
| 2006/0015940 A1 * | 1/2006 | Zamir et al. | 726/22 |
| 2008/0005797 A1 * | 1/2008 | Field et al. | 726/24 |

* cited by examiner

*Primary Examiner* — Mohammad Reza
(74) *Attorney, Agent, or Firm* — Baker Botts L.L.P.

(57) ABSTRACT

The present disclosure is directed to a method and system for detecting malware using a secure operating system mode. In accordance with a particular embodiment of the present disclosure a file is received. The file is stored in a secure directory. At least one operation is prevented on the file. A secure operating system mode is started to detect whether the file comprises malware.

21 Claims, 2 Drawing Sheets

METHOD AND SYSTEM FOR DETECTING MALWARE USING A SECURE OPERATING SYSTEM MODE

TECHNICAL FIELD

The present disclosure relates generally to computer security, and more particularly to a method and system for detecting malware using a secure operating system mode.

BACKGROUND

Computer security has become increasingly more important, particularly in order to protect against malware. Malware generally refers to any malicious computer program. For example, malware may include viruses, worms, spyware, adware, rootkits, and other damaging programs.

Malware may impair a computer system in many ways, such as disabling devices, corrupting files, transmitting potentially sensitive data to another location, or causing the computer system to crash. In addition, malware may be designed to conceal itself from software designed to protect a computer, such as antivirus software. For example, malware may infect components of a computer operating system and thereby filter the information that is provided to antivirus software.

SUMMARY

In accordance with the present invention, the disadvantages and problems associated with previous techniques for detecting malware may be reduced or eliminated.

In accordance with a particular embodiment of the present disclosure, a method for detecting malware using a secure operating system mode includes receiving a file. The method also includes storing the file in a secure directory. The method further includes preventing at least one operation on the file. The method further includes starting a secure operating system mode to detect whether the file comprises malware.

Technical advantages of particular embodiments of the present disclosure include a system and method for detecting malware using a secure operating system mode that provides protection against unknown malware. For example, the system may start a secure operating system mode that disables remote access to a client. In the secure operating system mode, it may be possible to install and execute files. If malware is detected, users and system administrators may receive advisory messages indicating the presence of the malware.

Further technical advantages of particular embodiments of the present disclosure include a system and method for detecting malware using a secure operating system mode where the malware is designed to conceal itself. For example, in the secure operating system mode, the system may verify that all new executable files in a particular directory are approved, and if any are not, they may be treated as malware.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

A common defense against malware, such as computer viruses and worms, is antivirus software. Antivirus software identifies malware by matching patterns within data to what is referred to as a "signature" of the malware. Typically, antivirus software scans for malware signatures. However, most antivirus software with signature-based protection does not identify unknown malware.

Further, malware may be distributed as one or more programs designed to conceal the malware from antivirus software. Malware designed to conceal itself or other malware is generally referred to as a rootkit. For example, antivirus software designed to protect a computer from malware relies on an operating system for information. If a rootkit is able to infect components of a computer operating system, the rootkit may control the information that is provided to the antivirus software.

In accordance with the teachings of the present disclosure, a secure operating system mode is provided that disables remote access to a client. In the secure operating system mode, it may be possible to install and execute files. The secure operating system mode may also provide secure directories that are allowed to contain unknown files. However, the method and system would also prevent those files from being loaded into a process in the default operating system mode. This way, a file, such as an install image, may be downloaded to the secure directory, and then run from that directory after starting the secure operating system mode. Starting the secure operating system mode may refer to any act of changing the operating system mode from its default mode and may include, for example, booting or rebooting the operating system. If malware is detected in the secure operating system mode, the user or administrator may be alerted to any dangerous changes to the files and may take any appropriate action to prevent the malware from infecting the client. Thus, the method provides protection against malware, including unknown malware and rootkits. Additional details of example embodiments of the present disclosure are described in detail below.

Figure 1:
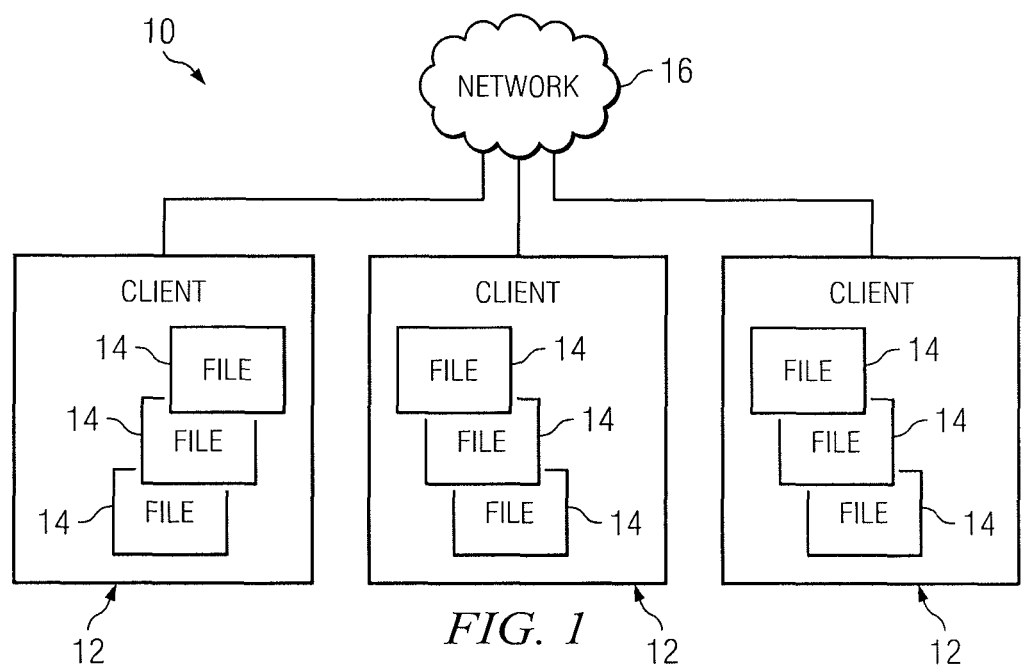
FIG. 1 is a block diagram illustrating a system for detecting malware using a secure operating system mode, according to the teachings of the present disclosure.

FIG. 1 is a block diagram illustrating a system 10 for detecting malware using a secure operating system mode, according to the teachings of the present disclosure. System 10 generally includes one or more clients 12 storing one or more files 14, and a network 16. According to the embodiment, client 12 may start a secure operating system mode that disables any remote access to and from network 16. In the secure operating system mode, it may be possible to install and execute files 14. If client 12 detects the presence of malware in a particular file 14, then client 12 may take any appropriate action to prevent the malware from infecting client 12.

Client 12 may refer to any suitable device operable store files 14. Client 12 may include, for example, a personal digital assistant, a computer such as a laptop, a cellular telephone, a mobile handset, or any other device operable to store file 14. Client 12 may include any operating system such as MS-DOS, PC-DOS, MAC-OS, WINDOWS, UNIX, OpenVMS, or other appropriate operating systems, including future operating systems.

File 14 may refer to any suitable data stored at client 12. For example, file 14 may be an executable file. An executable file, also referred to as a binary file, refers to data in a format that a processor may execute. File 14 may also include other data formats, such as a dynamic link library file, a data file, or any other suitable file that may be vulnerable to malware.

Network 16 may refer to any interconnecting system capable of transmitting audio, video, signals, data, messages, or any combination of the preceding. Network 16 may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

Network 16 may utilize protocols and technologies to transmit information. Example protocols and technologies include those described by the Institute of Electrical and Electronics Engineers, Inc. (IEEE) 802.xx standards such as 802.11, 802.16, or WiMAX standards, the International Telecommunications Union (ITU-T) standards, the European Telecommunications Standards Institute (ETSI) standards, Internet Engineering Task Force (IETF) standards, the third generation partnerships project (3GPP) standards, or other standards.

In one embodiment, one or more files 14 on clients 12 may be infected with malware. Once malware infects files 14, the malware may damage expensive computer hardware, destroy valuable data, or compromise the security of sensitive information. Malware may spread quickly and infect many networks before a signature for detecting the malware may be developed, distributed, and installed in antivirus software. Further, malware may conceal itself from most antivirus software.

According to one embodiment of the disclosure, a system and method are provided to detect malware before it may infect clients and networks. This is effected, in one embodiment, by starting a secure operating system mode that disables remote access to and from network 16. In the secure operating system mode, it may be possible to execute files 14. The secure operating system mode may also provide secure directories that contain unknown files 14. However, client 12 may prevent those files from being loaded into a process in its default operating system mode. This way, a file 14, such as an install image, may be downloaded to the secure directory, and then run from that directory after starting the secure operating system mode. Additional details of example embodiments of the disclosure are described in greater detail below in conjunction with portions of FIG. 2 and FIG. 3.

Figure 2:
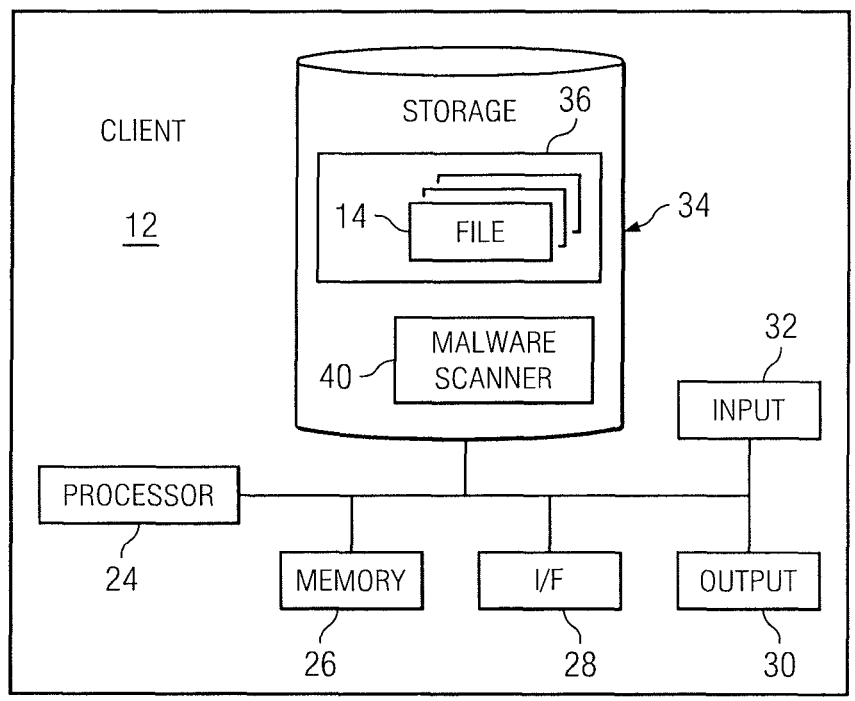
FIG. 2 is a block diagram illustrating an example client of the system of FIG. 1, according to one embodiment of the present disclosure.

FIG. 2 is a block diagram illustrating an example client 12 of the system of FIG. 1, according to one embodiment of the present disclosure. In the illustrated embodiment, client 12 includes a processor 24, a memory device 26, a communication interface 28, an output device 30, an input device 32, and a storage device 34. Storage device 34 includes a secured directory 36 storing files 14 and a malware scanner 40.

Malware scanner 40 may refer to any suitable hardware and/or logic embodied in computer-readable media, and when executed, that is operable to detect malware in an unknown file 14. In the illustrated embodiment of the disclosure, malware scanner 40 resides in storage device 34. In other embodiments of the disclosure, malware scanner 40 may reside in memory device 26, or any other suitable device operable to store and facilitate retrieval of data and instructions.

According to one embodiment of the disclosure, malware scanner 40 may be operable to provide one or more secure directories 36 for unknown files 14. For example, a user of client 12 may download unknown file 14 from network 16. Malware scanner 40 may determine whether unknown file 14 is a certain file type, such as an executable, and only allow the user to store unknown file 14 in one of the secure directories 36.

Malware scanner 40 may prevent at least one operation on unknown file 14 until malware scanner 40 scans the file to determine whether file 14 contains malware. An operation on unknown file 14 may include, but is not limited to, accessing unknown file 14, opening unknown file 14, and executing unknown file 14. For example, malware scanner 40 may move unknown file 14 to a particular quarantined location. As another example, malware scanner 40 may encrypt unknown file 14 so that it may not be accessed. Additionally, the present disclosure contemplates many types of techniques to prevent at least one operation on unknown file 14. Various embodiments may include some, all, or none of the enumerated techniques.

If the user desires to execute a new program using unknown file 14, malware scanner 40 may start a secure operating system mode. For example, upon requesting to or execute a new program using unknown file 14, the user may be prompted to reboot client 12 into the secure operating system mode.

If the user requests to reboot client 12, malware scanner 40 may change the registry of client 12 to disable the networking capability of client 12. When client 12 starts the secure operating system mode, client 12 may detect the registry change, and disable the networking capability of client 12 so that client 12 does not have remote access.

According to one embodiment of the disclosure, malware scanner 40 may scan all files 14 in the secure operating system mode to detect malware. For example, malware scanner 40 may determine if files 14 in the secure directories 36 are approved by comparing file 14 to one or more permitted files. If a particular file 14 is not approved, malware scanner 40 may determine that file 14 contains malware. In response, malware scanner 40 may perform any suitable technique to prevent file 14 from infecting client 12, such as quarantining file 14 or deleting file 14. If a particular file 14 is approved, malware scanner 40 may allow a user to or execute a new program using file 14 in the secure operating system mode.

Malware scanner 40 may be operable to provide a user with advisory messages, according to one embodiment of the disclosure. For example, if malware scanner 40 detects malware in file 14, malware scanner 40 may provide an advisory message to the user. The advisory message may be displayed using, for example, a window in a graphical application, a pop-up window, a dialog box, or any other suitable visual area operable to inform a user of vulnerability so that the user may take measures to prevent malware at client 12. Additional details of the other components of client 12 are described below.

Processor 24 may refer to any suitable device operable to execute instructions and manipulate data to perform operations for client 12. Processor 24 may include, for example, any type of central processing unit (CPU).

Memory device 26 may refer to any suitable device operable to store and facilitate retrieval of data, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Communication interface 28 may refer to any suitable device operable to receive input, send output, perform suitable processing of the input or output or both, communicate to other devices, or any combination of the preceding. Communication interface 28 may include appropriate hardware (e.g. modem, network interface card, etc.) and software, including protocol conversion and data processing capabilities, to communicate through a LAN, WAN, or other communication system that allows client 12 to communicate to other devices. Communication interface 28 may include one or more ports, conversion software, or both.

Output device 30 may refer to any suitable device operable for displaying information to a user. Output device 30 may include, for example, a video display, a printer, a plotter, or other suitable output device.

Input device 32 may refer to any suitable device operable to input, select, and/or manipulate various data and information. Input device 32 may include, for example, a keyboard, mouse, graphics tablet, joystick, light pen, microphone, scanner, or other suitable input device.

Storage device 34 may refer to any suitable device operable for storing data and instructions. Storage device 34 may include, for example, a magnetic disk, flash memory, or optical disk, or other suitable data storage device.

Figure 3:
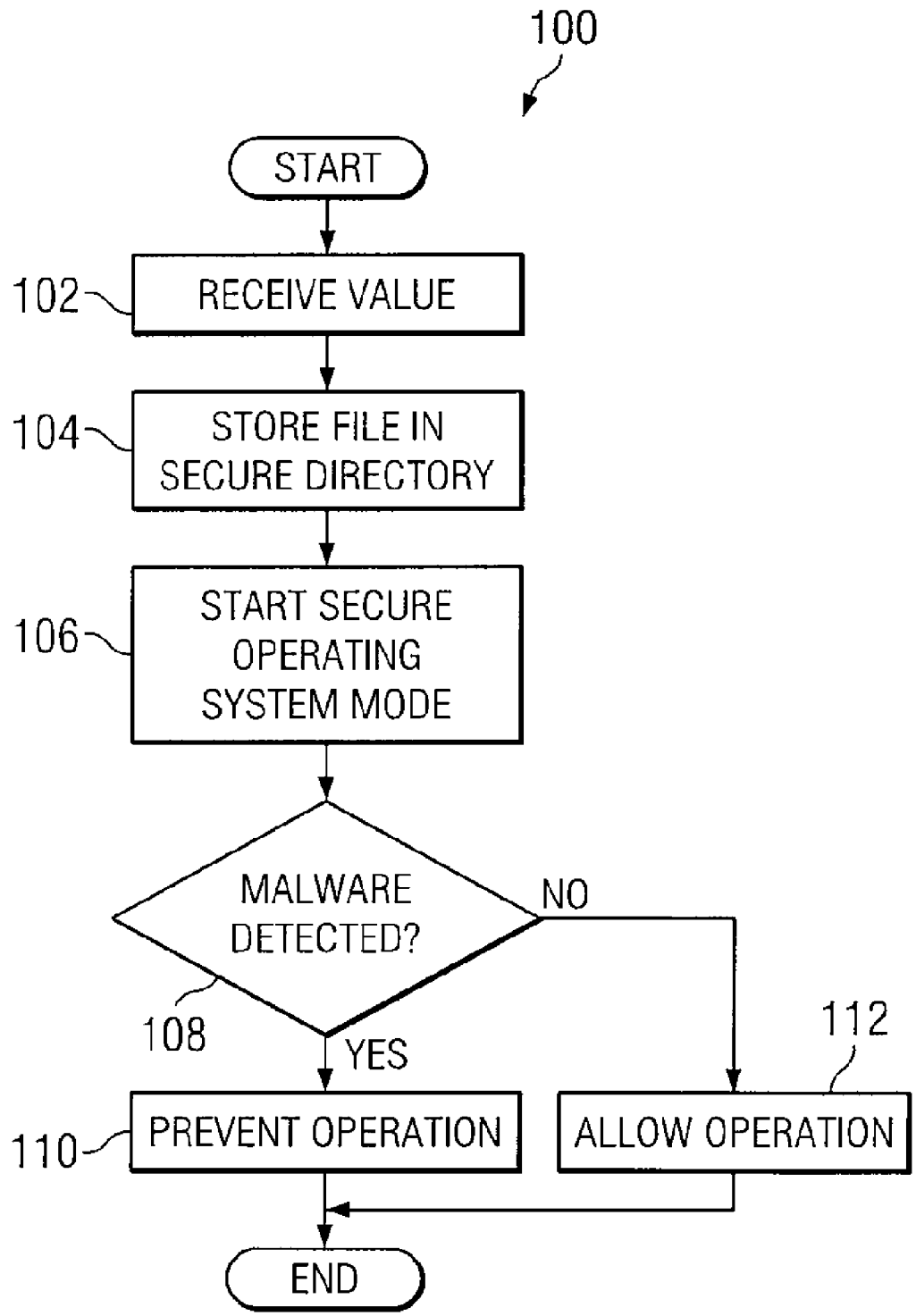
FIG. 3 is a flow diagram illustrating a method for detecting malware using a secure operating system mode, according to one embodiment of the present disclosure.

FIG. 3 is a flow diagram illustrating a method 100 for detecting malware using a secure operating system mode, according to one embodiment of the present disclosure. The method begins at step 102 where a file is received at a client. For example, a file may be received from a network. Next, at step 104, the file is stored in a secure directory at the client.

At step 106, the client starts a secure operating system mode to detect malware in the received file. If malware has been detected in the file at step 108, the method proceeds to step 110 where at least one operation is prevented for the file. For example, an operation on the file may include, but is not limited to, accessing the file, opening the file, and executing the file. Preventing the operation may include, for example, restoring the file to a previous mode, deleting the file, encrypting the file, storing the file in a quarantined location, or any other suitable technique for preventing operations on the file. If malware has not been detected in the file at step 108, the method proceeds to step 112 where at least one operation is allowed for the file, such as installing or executing the file.

Thus, the method described herein improves current methods to detect malware. Secure directories and a secure operating system mode prevent unknown files from potentially infecting clients and prevent remote access as the unknown files are scanned and/or executed. If malware is detected, the user or administrator may be alerted to any dangerous changes to the files and may take any appropriate action to prevent the malware from infecting the client. Thus, the method provides protection against malware, including unknown malware and rootkits.

Numerous other changes, substitutions, variations, alterations and modifications may be ascertained by those skilled in the art and it is intended that the present disclosure encompass all such changes, substitutions, variations, alterations and modifications as falling within the spirit and scope of the appended claims. Moreover, the present disclosure is not intended to be limited in any way by any statement in the specification that is not otherwise reflected in the claims.

What is claimed is:

1. A method for detecting malware using a secure operating system mode, comprising:
   Receiving, by a client computer system, a file;
   determining that the file is an executable;
   storing the file in a secure directory;
   preventing at least one operation on the file; and
   in response to determining that the file is the executable, prompting a user to reboot the operating system of the client computer system; and
   in response to the user rebooting the client computer system, starting the secure operating system mode to detect whether the file comprises the malware by comparing the file to one or more permitted files while the operating system of the client computer system is in the secure operating system mode, and
   wherein starting the secure operating system mode to detect whether the file comprises the malware further comprises detecting whether the file comprises the malware by comparing the file to one or more permitted files while an operating system of the client computer system is in the secure operating system mode by performing booting or rebooting an operating system of the client to change the operating system from a default unsecured mode to the secure operating system mode.

2. The method of claim 1, wherein preventing the at least one operation on the file comprises encrypting the file.

3. The method of claim 1, wherein preventing the at least one operation on the file comprises deleting the file.

4. The method of claim 1, further comprising generating an advisory message for a user that indicates the file comprises the malware.

5. The method of claim 1, wherein the file comprises an executable file.

6. The method of claim 1, further comprising allowing the at least one operation on the file if the file does not comprise the malware.

7. The method of claim 1, wherein:
   the file is received and stored on a client that is operable to remotely accessed via a network; and
   starting the secure operating system mode to detect whether the file comprises the malware comprises disabling remote access to the client via the network.

8. A system for detecting malware using a secure operating system mode comprising:
   a storage device; and
   a processor, the processor operable to execute a program of instructions operable to:
   receive a file;
   determine that the file is an executable;
   store the file in a secure directory;
   prevent at least one operation on the file; and
   in response to determining that the file is the executable, prompt a user to reboot the operating system of the processor; and
   in response to the user rebooting the operating system of the processor, start the secure operating system mode to compare the file to one or more permitted files while the operating system of the processor is in the secure operating system model wherein detecting whether the file comprises the malware is performed by comparing the file to one or more permitted files while an operating system of the processor is in the secure operating system mode by performing booting or rebooting an operating system of the client to change the operating system from a default unsecured mode to the secure operating system mode.

9. The system of claim 8, wherein the program of instructions is further operable to encrypt the file.

10. The system of claim 8, wherein the program of instructions is further operable to delete the file.

11. The system of claim 8, wherein the program of instructions is further operable to generate an advisory message for a user that indicates the file comprises the malware.

12. The system of claim 8, wherein the file comprises an executable file.

13. The system of claim 8, wherein the program of instructions is further operable to allow the at least one operation on the file if the file does not comprise the malware.

14. The system of claim 8, wherein:
the processor is operable to be remotely accessed via a network; and
starting the secure operating system mode to detect whether the file comprises the malware comprises disabling remote access to the processor via the network.

15. A non-transitory computer-readable media storing logic operable when executed on a processor to:
receive a file;
determine that the file is an executable;
store the file in a secure directory;
prevent at least one operation on the file; and
in response to determining that the file is the executable, prompt a user to reboot the operating system of the processor; and
in response to the user rebooting the operating system of the processor, start the secure operating system mode to compare the file to one or more permitted files while the operating system of the processor is in the secure operating system mode wherein detecting whether the file comprises the malware is performed by comparing the file to one or more permitted files while an operating system of the processor is in the secure operating system mode by performing booting or rebooting an operating system of the client to change the operating system from a default unsecured mode to the secure operating system mode.

16. The non-transitory computer-readable media of claim 15, wherein the logic is further operable to encrypt the file.

17. The non-transitory computer-readable media of claim 15, wherein the logic is further operable to delete the file.

18. The non-transitory computer-readable media of claim 15, wherein the logic is further operable to generate an advisory message for a user that indicates the file comprises the malware.

19. The non-transitory computer-readable media of claim 15, wherein the file comprises an executable file.

20. The non-transitory computer-readable media of claim 15, wherein the logic is further operable to allow the at least one operation on the file if the file does not comprise the malware.

21. The logic of claim 15, wherein:
the file is received and stored on a client that is operable to remotely accessed via a network; and
starting the secure operating system mode to detect whether the file comprises the malware comprises disabling remote access to the client via the network.

* * * * *